United States Patent
Polan et al.

(10) Patent No.: US 7,296,035 B2
(45) Date of Patent: Nov. 13, 2007

(54) SYSTEM AND METHOD FOR SYNCHRONIZING DATA REPOSITORIES

(75) Inventors: Michael G. Polan, Markham (CA); Alice T. Yeung, Markham (CA)

(73) Assignee: International Business Machines Corp., Armonk, NY (US)

( * ) Notice: Subject to any disclaimer, the term of this patent is extended or adjusted under 35 U.S.C. 154(b) by 489 days.

(21) Appl. No.: 10/655,069

(22) Filed: Sep. 5, 2003

(65) Prior Publication Data
US 2004/0064484 A1   Apr. 1, 2004

(30) Foreign Application Priority Data
Sep. 30, 2002   (CA)   ................................. 2406079

(51) Int. Cl.
G06F 12/00   (2006.01)
G06F 17/30   (2006.01)

(52) U.S. Cl. ...................................... 707/201; 707/200

(58) Field of Classification Search ......... 707/200–202
See application file for complete search history.

(56) References Cited

U.S. PATENT DOCUMENTS 5,629,980 A    5/1997   Stefik et al.
6,643,669 B1 *  11/2003  Novak et al. ............... 707/201
6,687,698 B1 *  2/2004   Nixon et al. ................ 707/10
6,721,735 B1 *  4/2004   Lee ............................. 707/5
7,107,592 B2 *  9/2006   Taylor et al. ............. 718/104
2001/0056461 A1  12/2001 Kampe et al.
2002/0038296 A1  3/2002  Margolus et al.
2002/0059299 A1 *  5/2002  Spaey ..................... 707/104.1
2003/0237081 A1 *  12/2003 Taylor ....................... 717/168
2004/0117804 A1 *  6/2004  Scahill et al. ............. 719/320

* cited by examiner

*Primary Examiner*—Sam Rimell
*Assistant Examiner*—Alicia M Lewis
(74) *Attorney, Agent, or Firm*—Greg Plow; SVL, IP Law

(57) ABSTRACT

A system and method for synchronizing a first data repository with a second data repository is disclosed. The method includes: a) detecting a change to data in the first data repository; b) communicating the change from the first data repository to the second data repository via the Internet using SOAP over HTTP; and c) updating data in the second data repository with the change. The system includes a first computing device which communicates with the first data repository and a second computing device which communicates with the second data repository. The first computing device detects a change to data in the first data repository and communicates the change to the second computing device via the Internet using SOAP over HTTP. The second computing device updates data in the second data repository with the change.

15 Claims, 4 Drawing Sheets

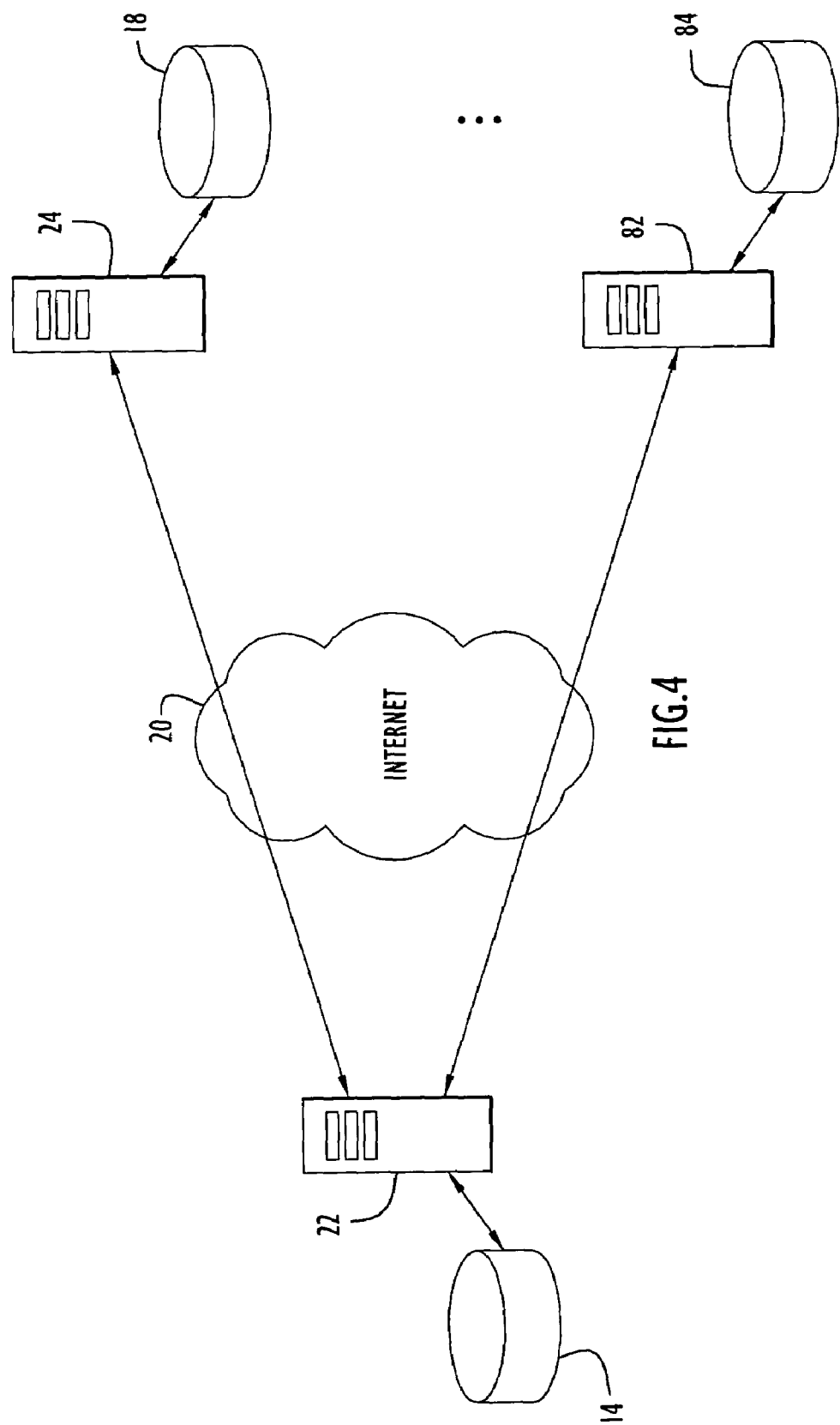

SYSTEM AND METHOD FOR SYNCHRONIZING DATA REPOSITORIES

FIELD OF THE INVENTION

The invention relates to data repositories, and in particular, to synchronizing data repositories.

BACKGROUND OF THE INVENTION

Information is widely acknowledged as one of the most important assets of the modern economy. However, it is difficult to take full advantage of the asset without effective means for storing and managing information.

One well known way of storing and managing information is electronically via a data repository. Typically, a data repository is a database, such as a relational database.

Increasingly, it is desirable that the information stored in one data repository be replicated in one or more other data depositories. When the information changes, in one of the data repositories, it must be updated or synchronized with corresponding information in the other depositories.

There are a number of well known methods of synchronizing data depositories. One such approach requires manual data entry of the relevant information into all affected data repositories using, for example, Web-based forms. This approach has the disadvantages of being time consuming and costly due to the labor cost involved. It also introduces the possibility of data entry errors.

Another prior art approach allows automatic electronic updating of data repositories through the use of proprietary communication protocols and direct connections between the data repositories. The direct connections have the disadvantages of requiring costly infrastructure and lack of flexibility for connecting data repositories running on different computer platforms.

Accordingly, there is a need for systems and methods of synchronizing data repositories which automate the synchronization function, which provide improved interoperability between different platforms, and which are less expensive.

SUMMARY OF THE INVENTION

According to a first aspect of the invention, a method for synchronizing a first data repository with a second data repository is provided. The method comprises: a) detecting a change to data in the first data repository; and b) communicating the change from the first data repository to the second data repository via the Internet. Preferably, the change is communicated from the first repository to the second repository using Simple Object Access Protocol (SOAP) over Hypertext Transfer Protocol (HTTP). More preferably, the method further comprises updating data in the second data repository with the change.

According to a second aspect of the invention, a system for synchronizing a first data repository with a second data repository is provided. The system comprises a first computing device adapted to communicate with the first data repository, and a second computing device adapted to communicate with the second data repository. The first computing device is adapted to detect a change to data in the first data repository and to communicate the change to the second computing device via the Internet. The second computing device is adapted to update data in the second data repository with the change. Preferably, the change is communicated from the first repository to the second repository using SOAP over HTTP.

According to a third aspect of the invention, a computer readable medium, including a computer program that synchronizes a first data repository with a second data repository, is provided. The computer program causing the computer to perform the steps of: a) detecting a change to data in the first data repository; and b) communicating the change from the first data repository to the second data repository via the Internet. Preferably, the change is communicated from the first repository to the second repository using SOAP over HTTP.

By communicating over the Internet, preferably using SOAP over HTTP, the present invention facilitates synchronization between data repositories protected by firewalls and operating on different platforms, while maintaining the security configuration of the participating data repositories.

BRIEF DESCRIPTION OF THE DRAWINGS

The present invention will now be described by way of example only with reference to the accompanying drawings, in which:

FIG. 4 is a schematic diagram of an alternative embodiment of the present invention.

DETAILED DESCRIPTION OF THE INVENTION

Figure 1:
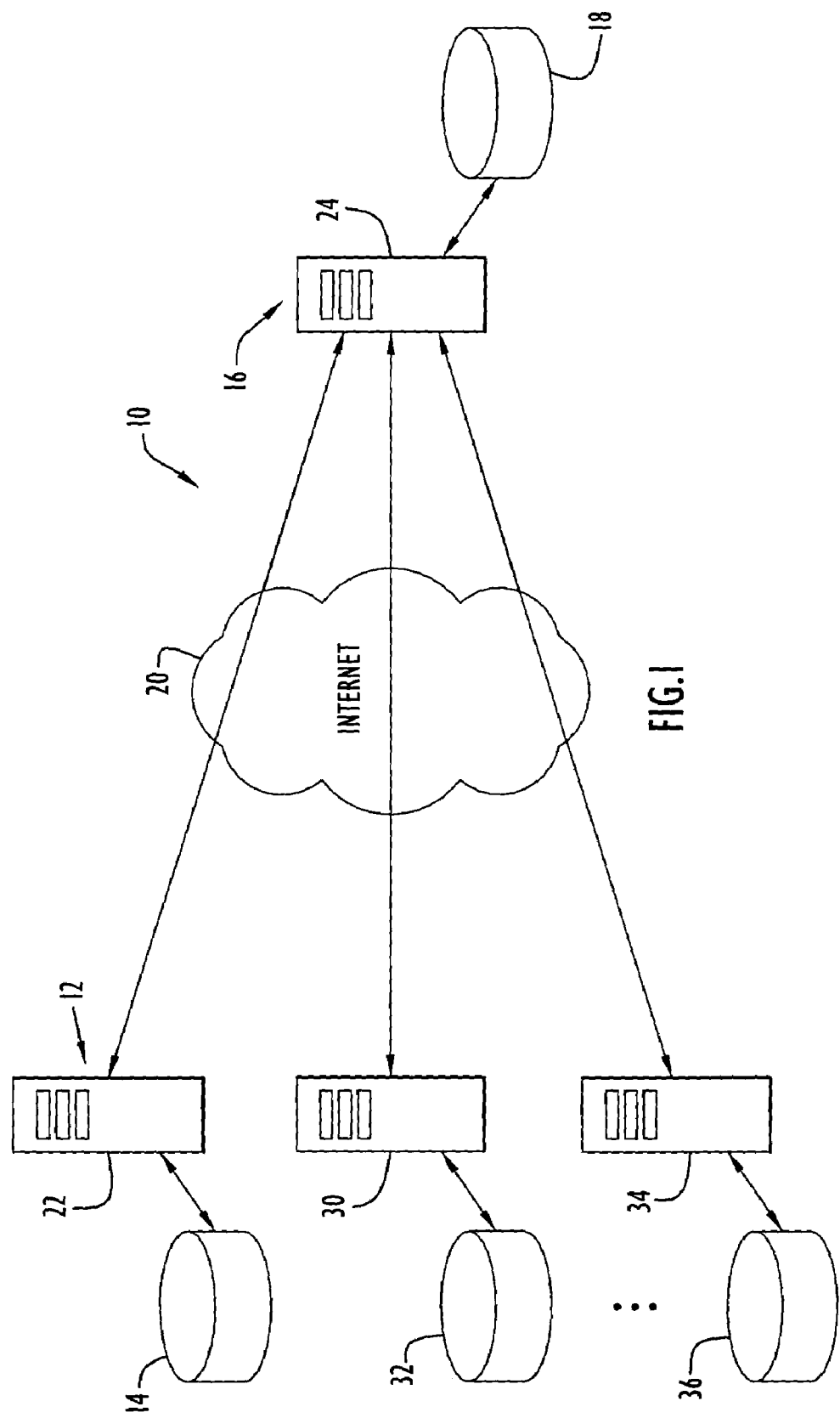
FIG. 1 is a schematic diagram of a system according to the present invention.

FIG. 1 shows one embodiment of the present invention. A system 10, includes a first computing device 12 in communication with a first data repository 14. The system 10 also includes a second computing device 16 in communication with a second data repository 18. The first and second computing devices are capable of communicating with each other via the Internet 20. The computing devices 12, 16 may be a personal computer, client, server, Personal Digital Assistant (PDA), wireless telephone, or any other Internet-enabled computing device known in the art. The computing devices 12, 16 connect to the Internet by telephone modem, cable modem, wireless modem, DSL modem, local area network (LAN), wide area network (WAN), T1, or any other means known in the art.

Continuing to refer to FIG. 1 the first computing device 12 preferably comprises a first client 22 running thereon. The first client 22 is in communication with the first data repository 14, which may be a relational database or any other data storage means known in the art. The first data repository 14 may reside locally on the first computing device 12 along with the first client 22 or may reside on one or more remote computing devices.

The second computing device 16 preferably comprises a server 24 running thereon. The server is preferably implemented as one or more web services (discussed in detail below). As used herein, "web service" means any suitable means for programmatically exchanging data over the Internet. The server 24 is in communication with the second data repository 18, which may be a relational database or any other storage means known in the art. The second data repository 18 may reside locally on the server 24 or may reside on one or more remote computing devices.

The system 10 may include additional computing devices 30, 34 in communication with additional data repositories 32, 36 respectively. Preferably, the computing devices 30, 34 are second and third clients, respectively. However, it will be understood by those skilled in the art that the system 10 may include only the first and second computing devices 12, 16, respectively or it may include any number of additional computing devices. It will also be understood by those skilled in the art that the additional computing devices may be servers, clients, or any combinations thereof.

Figure 2:
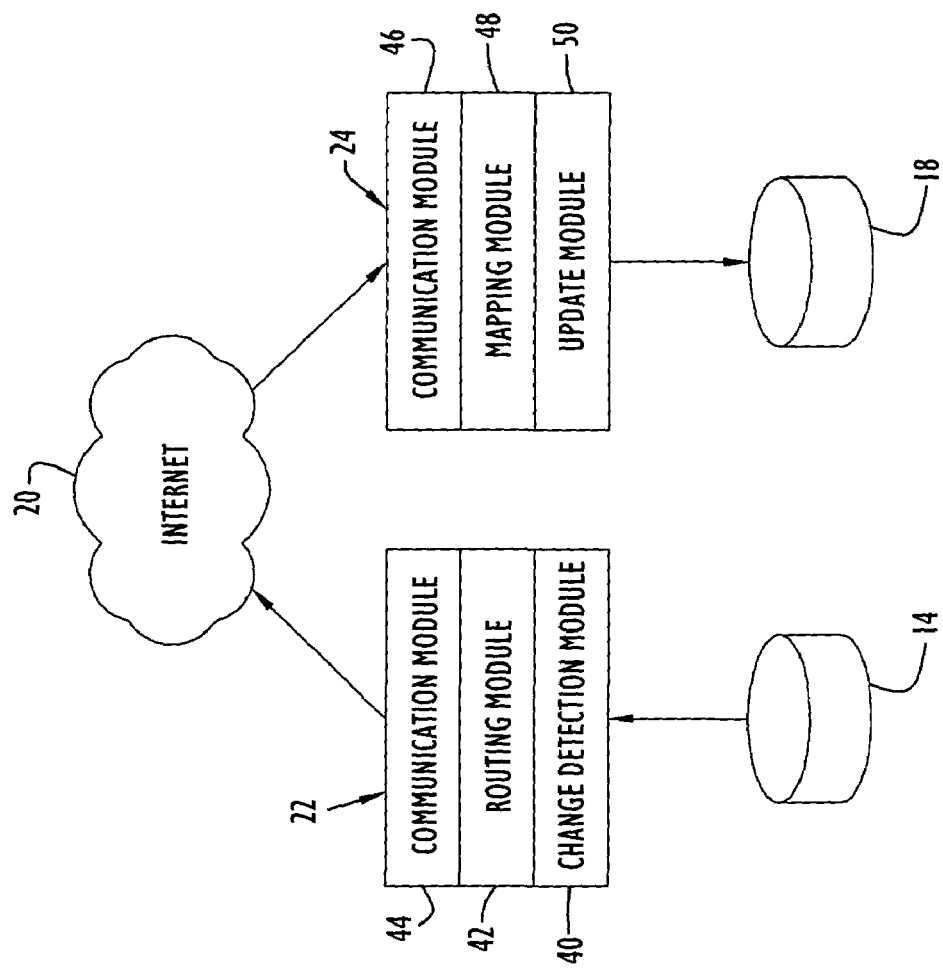
FIG. 2 is a block diagram of a preferred embodiment of the system.

FIG. 2, shows a preferred embodiment of the first client 22 and server 24. The first client 22 includes a change detection module 40 which communicates with the first data repository 14. The change detection module 40 detects changes in the first data repository 14. A routing module 42 is in communication with the change detection module 40. The routing module 42 determines which selected servers are to be notified of a given change. A client communications module 44 is in communication with routing module 42. The client communications module 44 translates the change to a selected transport protocol and transmits the change to a corresponding server communications module 46 via the Internet 20. Preferably, the client and server communications modules 44, 46 communicate using the Simple Object Access Protocol (SOAP) over Hypertext Transfer Protocol (HTTP).

Continuing to refer to FIG. 2, the server communications module 46 translates the incoming changes from SOAP to the internal protocol used by the server 24. The server communications module 46 is in communication with a mapping module 48, which associates the incoming changes into correct repository objects, and converts the changes to the appropriate data format. The mapping module 48 is in communication with the update module 50, which in turn, is in communication with the second data repository 18. The update module 50 updates the second data repository with the data received from the mapping module 48.

The logic of the present invention may be contained on a data storage device with a computer readable medium, such as a computer diskette. Alternatively, the instructions may be stored on a magnetic tape, conventional hard disk drive, electronic read-only memory, optical storage device, or other appropriate data storage device or transmitting device thereby making a computer program product, i.e., an article of manufacture according to the invention. In an illustrative embodiment of the invention, the computer-executable instructions may be lines of Java code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its preferred embodiment by a machine component that renders the program elements in a form that instructs a digital processing apparatus (for example, a computer) to perform a sequence of function steps corresponding to those shown.

The operational logic of the present invention will now be described with reference to FIGS. 2 and 3. At step 60, the first data repository 14 is modified by a process (such as a manual change through a Web-based form) or another application (not shown). At step 62, the object and attribute of the change are stored in the first data repository 14. The change detection module 40 of the first client 22 detects the change to the first data repository 14.

At decision step 64, the routing module 42 determines whether the change relates to an object or data which has been replicated in the second data repository 18 (and therefore requires updating). If the answer is no, then the decision flow ends at state 66. If the answer is yes, the logic flow moves to step 68, where the routing module 42 identifies second repository 18 from a set of remote repositories registered to monitor the changed object. The communications module 44 makes a SOAP remote procedure call (RPC) to the server 24 to report the changed data. The use of SOAP over HTTP permits the communication to easily pass through firewalls, which are already configured to permit HTTP communication. The logic flow for the client 22 then ends at state 70.

The SOAP RPC 72 preferably includes the updated object and includes the Object ID, attribute ID, and the data change. The SOAP RPC 72 is received by the server communications module 46 at step 74. The mapping module 48 receives the information in the SOAP RPC 72 and determines the correct repository (if more than one), object and attribute to be modified using the set of replicated objects. Each object in the data repositories may be located using a unique identifier. These identifiers are often specific to the data repository. The mapping module 48 consults a table of references stored locally as part of the mapping module or in an external persistent repository that maps the object identifier from the first repository 14 to the matching identifier and object in the second repository 18. Each attribute of the objects can be uniquely identified by the attribute name. The mapping layer maps the attribute names from the first repository 14 to the corresponding attribute names in the second repository 18. At step 76, the update module 50 updates the second data repository 18 with the data change by storing the object and attributes received in the SOAP RPC 72 into the corresponding object and its attributes using the mapping obtained by the mapping module 48. This implementation reduces firewall issues, and enhances interoperability between data repositories operating on different platforms and standards, while improving security and authorization.

The above logic may be implemented in pseudo code which would be invoked when there was a change of data in the first repository 14 managed by the first client 22, as follows:

```
//Each external repository is represented by a profile that describes among other things
//how to contact (invoke a soap service) on that repository
//A map is kept of the repository to the list of objects that are registered and must be
//replicated to that domain.
    Map of { ExternalRepositoryDescriptions } to { Set of externallyRegisteredObjects }
called externalRepositories;
    repositoryObjectAttributesChanged(RepositoryObject repositoryObject)
```

```
{
    for ( each repository in externalRepositories)
    {
        if ( repositoryObject is in repository.externallyRegisteredObjects)
        {
            //a SOAP RPC call to indicate to the remote repository
            //that the attributes have changed. Note that the mapping of
            //attributes from the client format to the server format is specific
            //to the remote repository.
            repository.SOAP_attributesChanged(
                repository.getIdFor(repositoryObject),
                repository.getMappedAttributesFor(repositoryObject));
        }
    }
}
```

The following pseudo code may be invoked by the server 24 to record changes to an identified object:

```
Map of { remoteObjectIds } to { localObjectIds } called objectMap;
Static map of { remoteAttributeNames } to { localAttributeNames } called attributeMap;
RemoteObjectChanged ( remoteObjectId rid, map ( remoteAttributeNames to newValues) called
updatedAttributes)
{
    // find the id of the local object representing the remote object
    localObjectId lid = objectMap.getValue(rid);
    for ( each attribute in updatedAttributed)
        // Update the matching attribute of the local object using the mapping from
attributeMap
}
```

Figure 3:
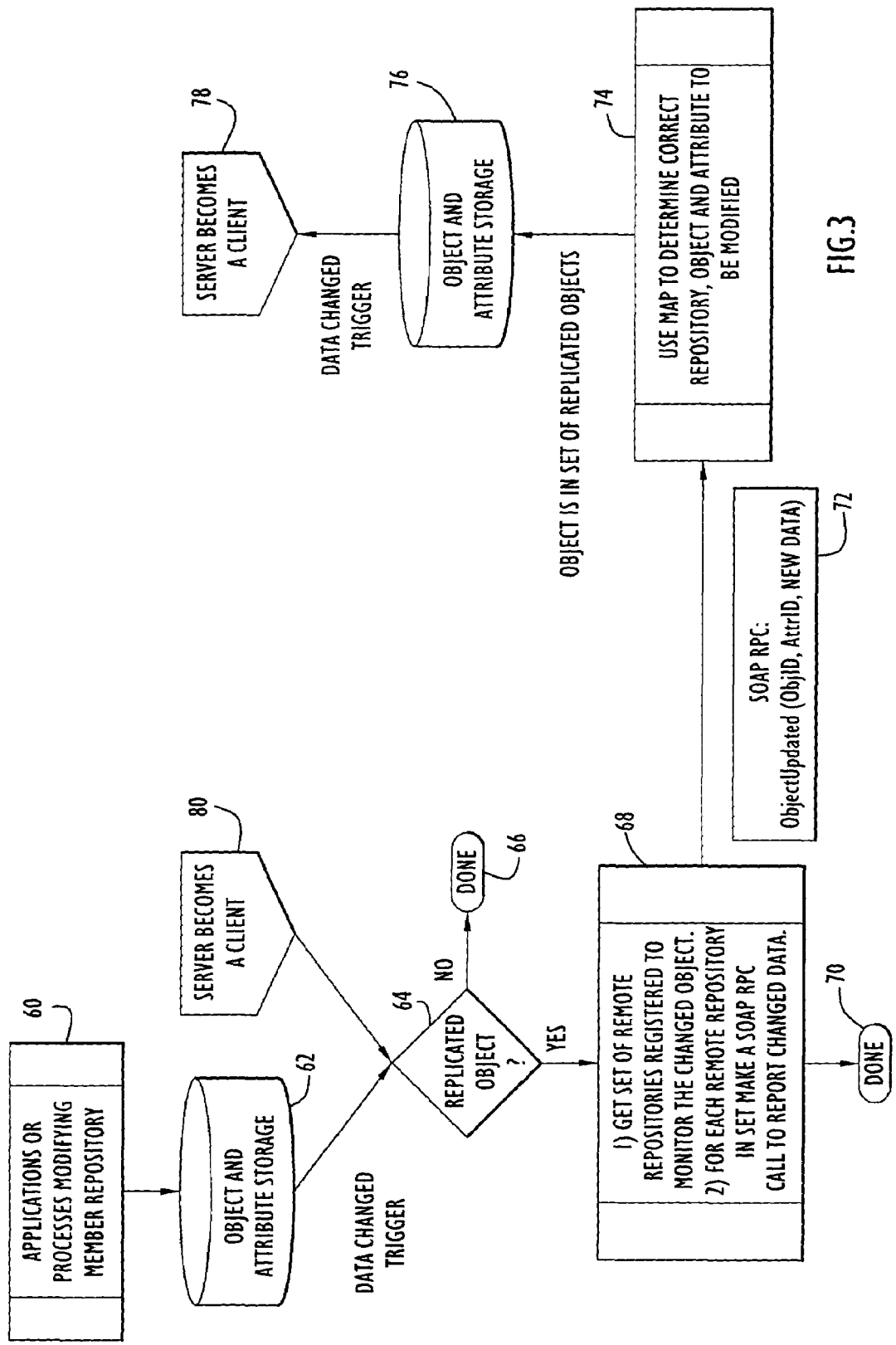
FIG. 3 is a flow diagram of the operation of the present invention.

Referring now to FIGS. 1 and 3, if the change received by the server 24 is required to be published to additional data repositories 32, 36, the second computing device 16 may also comprise a client loaded thereon (substantially similar to first client 22) in addition to server 24. The second computing device may then take on the role of the client 22 at state 78 (also shown as state 80 on the client side of FIG. 3 for illustrative purposes). The second computing device 16, acting as a client, may then perform steps 64-70 to communicate the change to the additional computing devices 30, 34, which act as servers to perform steps 74 and 76 for synchronization of additional data repositories 32, 36. In addition, the second computing device 16, acting as a client, may also communicate changes to the first computing device 12. In such an embodiment, the first computing 12 device may include a server loaded thereon (substantially similar to server 24) to perform steps 74 and 76.

It will be understood by those skilled in the art that a production implementation of this code would include error handling and performance enhancements. It will be further understood that the supported server functions would include create and delete as well as update operations.

The present invention may be implemented in a wide variety of uses. One such use relates to an on-line hosted marketplace where member organizations access an exchange to purchase a variety of products from an e-marketplace host. For example, a member organization may have a first data repository 14, where it will store profile information about the employees who are authorized to access the marketplace, and the marketplace host will have a second data repository 18 which will also require replication of the same information. Client 22 at the member organization may be used to submit updates of the employee profile data automatically to a server 24 at the marketplace host. The client 22 may be customized to filter and submit only the information required by the marketplace host, as discussed above.

The present invention may utilize the second data repository 18 of the marketplace host as a reference for retrieving profile data of members outside a particular member organization. For example, shipping details may be retrieved in a marketplace system.

FIG. 4, shows an alternative embodiment of the present invention, showing two servers 24, 82 in communication with two data repositories 18, 84 and one client 22 in communication with the first data repository 14. In this embodiment the client 22 may synchronize the first data repository 14 with two servers 24, 82 in the manner described above. Alternatively, the server 24 may act as a client to synchronize its data The present invention provides the advantage of automating the synchronization of data repositories by detecting a change in the first depository and communicating the change to the second repository. By communicating using SOAP over HTTP, the present invention enables synchronization between data repositories protected by firewalls and operating on different platforms, while maintaining the security configuration of the participating data repositories. Exposing the data repositories as web services facilitates the implementations of advanced integrated applications which take advantage of the availability of data through the Internet.

While the present invention as herein shown and described in detail is fully capable of attaining the above-described objects of the invention, it is to be understood that the presently preferred embodiment of the present invention is merely representative of the subject matter which is broadly contemplated by the present invention, that the scope of the present invention fully encompasses other embodiments which may be suggested to those skilled in the art in view of the teachings herein, and that the scope of the present invention is defined by the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

What is claimed is:

1. A method of synchronizing a first database with a second database, comprising:
   (a) detecting a change to data in said first database;
   (b) generating a remote procedure call in accordance with a Simple Object Access Protocol in response to said second database including data related to said change, wherein said remote procedure call includes an object identifier and an attribute identifier each specific to said first database to identify a changed object within said first database and a changed attribute of said changed object; and
   (c) communicating said remote procedure call from said first database to said second database over the Internet via said protocol and translating said object and attribute identifiers within said received remote procedure call to corresponding object and attribute identifiers specific to said second database to identify a corresponding object and attribute of that object within said second database to update with said change.

2. The method of claim 1, wherein step (c) further comprises:
   (c.1) communicating said remote procedure call using Simple Object Access Protocol over Hypertext Transfer Protocol.

3. The method of claim 1, wherein said first database is in communication with a first client and said second database is in communication with a server.

4. The method of claim 3, wherein step (a) further comprises:
   (a.1) detecting a change to data in said first database via said first client.

5. The method of claim 4, wherein step (c) further comprises:
   (c.1) sending said change to said server via said first client.

6. The method of claim 3, wherein step (c) further comprises:
   (c.1) updating said data in said second database with said change via said server.

7. The method of claim 3, further comprising:
   (d) communicating said change from said server to a second client in communication with a third database.

8. The method of claim 7, wherein step (d) further includes:
   (d.1) determining whether said second database includes data relating to said change via said server and prior to communicating said change to said second client.

9. A system for synchronizing a first database with a second database, comprising:
   a first computing device to communicate with said first database and a second computing device to communicate with said second database;
   wherein said first computing device includes:
      a change detection module to communicate with said first database and to detect a change to data in said first database;
      a routing module in communication with said change detection module to generate a remote procedure call in accordance with a Simple Object Access Protocol in response to said second database including data related to said change, wherein said remote procedure call includes an object identifier and an attribute identifier each specific to said first database to identify a changed object within said first database and a changed attribute of said changed object; and
      a first communications module to communicate said remote procedure call from said first computing device to said second computing device over the Internet via said protocol;
   wherein said second computing device includes:
      a second communications module to receive said remote procedure call from said first computing device;
      a mapping module in communication with said second communications module to translate said object and attribute identifiers within said received remote procedure call to corresponding object and attribute identifiers specific to said second database to identify a corresponding object and attribute of that object and associate said change with corresponding data in said second database; and
      an update module to communicate with said second database and to update data in said second database with said change.

10. The system of claim 9, wherein said first and second computing devices are configured to communicate using Simple Object Access Protocol over Hypertext Transfer Protocol.

11. The system of claim 9, wherein said first computing device comprises a server, and said second computing device comprises a first client.

12. The system of claim 9, wherein said first computing device comprises a first client, and said second computing device comprises a server.

13. The system of claim 12, wherein said second computing device further comprises a second client loaded thereon to communicate changes to said first computing device and said first computing device further comprises a second server loaded thereon to update said first database with data received from said second computing device.

14. A program product apparatus having a computer readable medium with computer program logic recorded thereon for synchronizing a first database with a second database, said program product apparatus comprising:
   a change detection module to detect a change to data in said first database;
   a communication module to generate a remote procedure call in accordance with a Simple Object Access Protocol in response to said second database including data related to said change and to communicate said remote procedure call from said first database to said second database over the Internet via said protocol, wherein said remote procedure call includes an object identifier and an attribute identifier each specific to said first database to identify a changed object within said first database and a changed attribute of said changed object; and an update module to translate said object and attribute identifiers within said received remote procedure call to corresponding object and attribute identifiers specific to said second database to identify a corresponding object and attribute of that object within said second database to update with said change.

15. The program product apparatus of claim 14 wherein said communication module further includes:

a Hypertext Transfer Protocol module to communicate said remote procedure call using Simple Object Access Protocol over Hypertext Transfer Protocol.

* * * * *

UNITED STATES PATENT AND TRADEMARK OFFICE
CERTIFICATE OF CORRECTION

PATENT NO. : 7,296,035 B2
APPLICATION NO. : 10/655069
DATED : November 13, 2007
INVENTOR(S) : Michael G. Polan It is certified that error appears in the above-identified patent and that said Letters Patent is hereby corrected as shown below:

This certificate supersedes the Certificate of Correction issued November 24, 2009. The certificate should be vacated since no Certificate of Correction was granted for this patent number.

Signed and Sealed this

Twenty-sixth Day of January, 2010

David J. Kappos
*Director of the United States Patent and Trademark Office*